United States Patent [19]

Meyer

[11] 4,141,436
[45] Feb. 27, 1979

[54] DISC BRAKE AND A GUIDE KEY FOR THE SAME

[75] Inventor: Yves Meyer, Taverny, France

[73] Assignee: Societe Anonyme DBA, Paris, France

[21] Appl. No.: 879,185

[22] Filed: Feb. 21, 1978

Related U.S. Application Data

[63] Continuation of Ser. No. 771,868, Feb. 25, 1977, abandoned.

[30] Foreign Application Priority Data

Mar. 16, 1976 [FR] France .................................. 76 07458

[51] Int. Cl.$^2$ ............................................. F16D 55/00
[52] U.S. Cl. ................................... 188/71.1; 188/73.3; 308/239
[58] Field of Search .................... 188/71.1, 72.4, 72.5, 188/73.3, 73.5, 73.4; 308/237 R, 239, 241

[56] References Cited

U.S. PATENT DOCUMENTS

| | | | |
|---|---|---|---|
| 1,153,647 | 9/1915 | Smalley | 308/239 |
| 1,299,799 | 4/1919 | Smalley | 308/239 |
| 3,403,756 | 10/1968 | Thirion | 188/73.3 |

*Primary Examiner*—George E. A. Halvosa
*Attorney, Agent, or Firm*—Paul David Schoenle; Ken C. Decker

[57] ABSTRACT

A disc brake of the type comprising a caliper or frame member straddling a rotary disc and slidable on two circumferentially spaced surfaces of a fixed member by at least one key. The key is associated to one of the members and defines a guide surface which slidably cooperates with a corresponding surface defined on the other member. According to the invention, the guide surface comprises at least one assembly of relatively small surfaces separated by two series of parallel and equispaced grooves, and a smooth continuous surface forming a frame circumscribing the assembly of surfaces.

1 Claim, 8 Drawing Figures

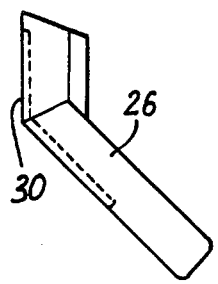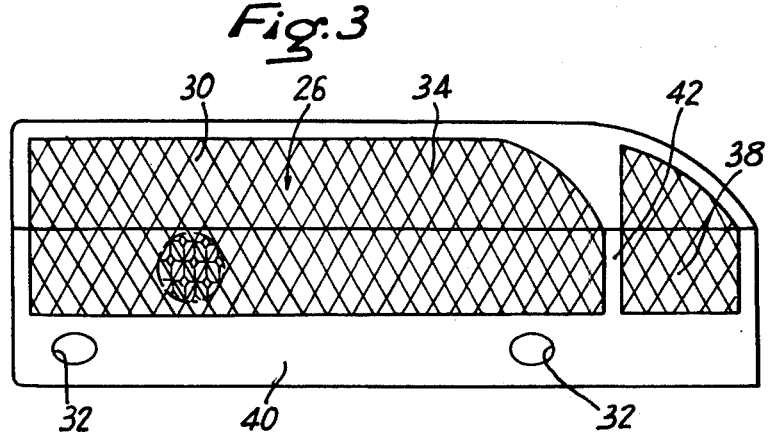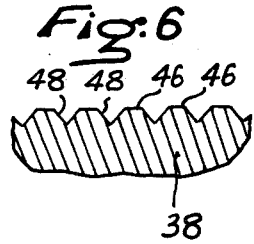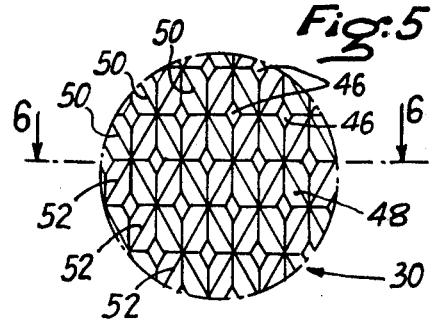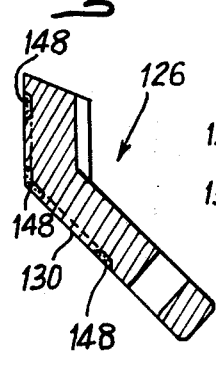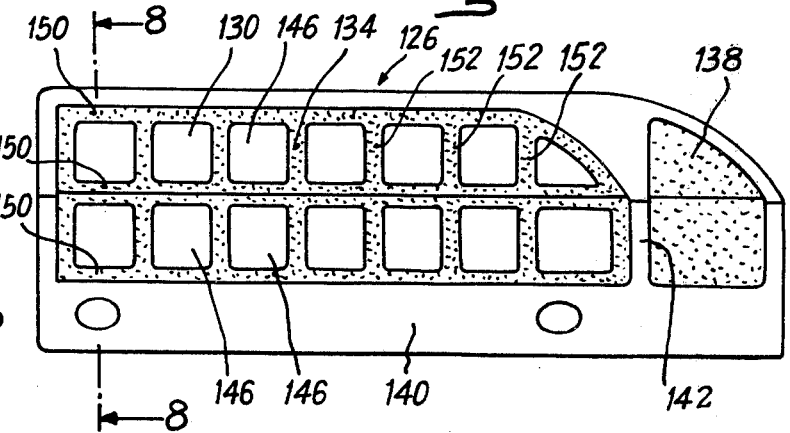

DISC BRAKE AND A GUIDE KEY FOR THE SAME

This is a continuation, of application Ser. No. 771,868, filed Feb. 25, 1977, now abandoned.

The invention relates to a disc brake for an automotive vehicle.

More particularly, the invention concerns a disc brake of the type comprising a caliper member straddling a rotary disc and slidable on two circumferentially spaced surfaces of a fixed member by means of at least one guide key, brake applying means being associated with the caliper or frame member so as to urge directly a first friction pad and by reaction, a second friction pad on to the respective faces of the disc, said guide key being associated with one of the said members and comprising a guide surface which slidably cooperates with a corresponding surface of the other member.

The invention also relates to a guide key for use in a brake of this type.

Brakes of the type described have the particular advantage of being relatively easy to make. Unfortunately, however, it is harder to protect the sliding surfaces in brakes with guide keys than in brakes in which the caliper or frame member slides on mounting pins attached to the fixed member. Under particularly severe operating conditions, impurities between the sliding surfaces impede sliding of the caliper or frame member and may cause it to jam due to adhesion between the contacting surfaces, which cover a relatively large area of the keys.

To overcome this disadvantage, according to the invention, the said guide surface of the key comprises at least one assembly of relatively small surfaces separated by recesses.

According to another aspect of the invention, to improve sliding of the caliper further, the recesses contain a liquid or semi-solid lubricant.

The risk of adhesion between portions in contact over a large area is therefore avoided, and the recesses separating the relatively small surfaces which define the guide surface of the key will accomodate any impurities which nevertheless slip between the sliding surfaces, while at the same time holding liquid or semi-solid lubricant.

According to another aspect of the invention, the length of the guide surface in the direction in which the caliper or frame member slides is at least equal to the length of the corresponding surface formed on the said other member and capable of cooperating with the guide surface of the key as the caliper or frame member slides. The sliding surfaces are therefore protected irrespective of the wear on the pad linings, and there are no exposed sliding surface to which impurities can adhere.

According to still another aspect of the invention, the guide surface of the key comprises, at least on its peripheral edges, a smooth continuous surface forming a frame defining the assembly of relatively small surfaces, said continuous surface slidably cooperating with the other member. With such an arrangement the recesses in the guide surface of each key do not communicate with the exterior, and this further reduces the ingress of impurities.

According to still another aspect of the invention, in order to improve further the sliding characteristics of the caliper or frame member, each key is coated with a layer of solid lubricant such as polytetrafluoroethylene, at least on its guide surface. Preferably, each key is then coated with cadmium to fill any irregularities in the solid lubricant so as to remove the risk of premature corrosion of the keys.

The invention also concerns a guide key for a disc brake embodying the invention, the key being characterized in that it has a substantially V-shaped cross-section, the guide surface being on the outside surfaces of the V.

The invention will be now described by way of example with reference to the accompanying drawings, in which:

FIG. 3 shows one of the keys for the disc brake shown in FIGS. 1 and 2, looking on to its guide surface;

FIG. 4 is a section along a line 4—4 in FIG. 3;

FIG. 5 shows part of the guide surface of the key shown in FIGS. 3 and 4, on a larger scale;

FIG. 6 is a section along a line 6—6 in FIG. 5;

FIG. 7 is a view similar to FIG. 3, illustrating another key embodying the invention; and FIG. 8 is a section along a line 8—8 in FIG. 7.

Figure 1:
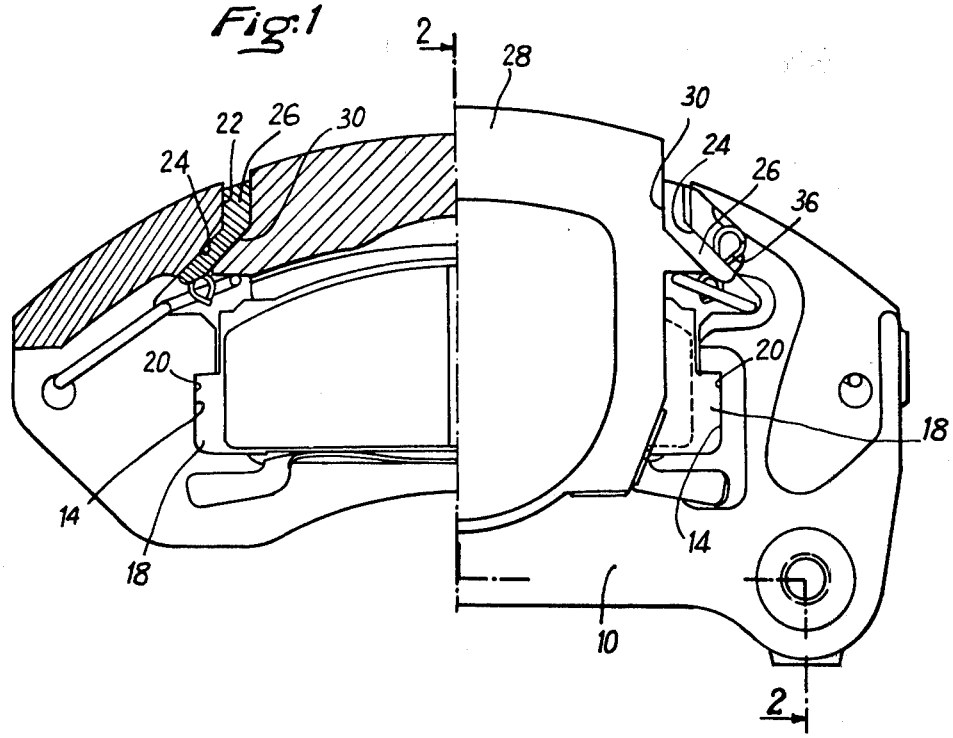
FIG. 1 represents an elevation half in section along a line 1—1 in FIG. 2, of a disk brake embodying the principles of the invention.
Figure 2:
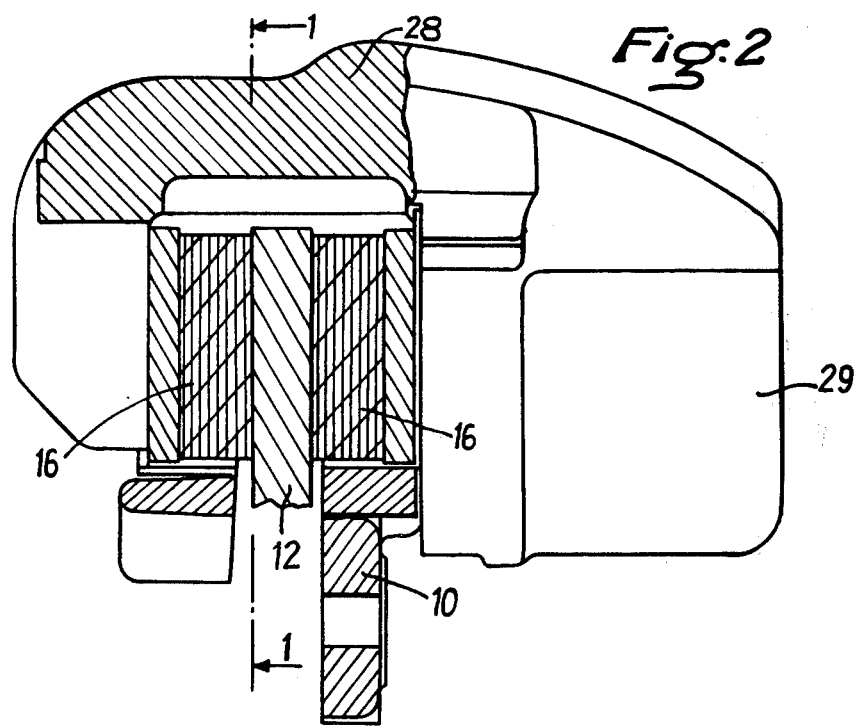
FIG. 2 represents a section along a line 2—2 in FIG. 1.

The disc brake shown in FIGS. 1 and 2 comprises a fixed member 10 in the form of a U of which the two arms extend either side of a disc 12, substantially parallel to the faces of the disc. Each arm of the fixed member 10 defines a window 14 which receives a friction pad 16. Each of the pads 16 has a backing plate to which a friction lining is attached by any known means, for example adhesive or rivets. The backing plate of each pad 16 bears on each of its circumferential ends a lug 18 slidable in a recess 20 in the associated window 14.

The fixed member 10 also contains a radial aperture 22 defining circumferentially spaced edges 24 which slidably receive a caliper member 28 by way of keys 26. Brake applying means 29 associated with the caliper member 28 urge directly one pad 16 and, by reaction, the other pad 16 on to the respective faces of the disc 12. The brake applying means 29 may be of any conventional type, for example, a piston mounted in a cylinder and operated by hydraulic fluid pressure from the master cylinder of the vehicle (not shown).

As FIGS. 3 and 4 shown, in cross-section each key 26 substantially forms a V of which the outside surfaces form the guide surfaces 30 for the caliper member 28. Pins 36 or the like are placed in holes 32 in the keys 26 to hold the latter in position relative to the fixed member 10.

Preferably the length of the guide surface 30 on each key 26 is at least equal to the length of the corresponding sliding surface formed on the caliper member 28 and capable of cooperating with each surface 30 as the caliper member 28 slides. With this arrangement, appreciable quantities of impurities will adhere only to brake portions which will not become operative sliding surfaces when the linings of the pads 16 are worn.

In accordance with the invention, as best shown in FIGS. 3 to 6, the guide surface 30 of each key 26 is in two axially spaced portions 34, 38, defined by a smooth, continuous surface forming a frame 40 and also comprising a portion 42 substantially perpendicular to the direction in which the caliper 28 slides. The portion 42 of the smooth, continuous surface defines the guide surface 30 of the key 26 when the linings of the pads 16 are new. Each of the portions 34, 38 comprises an assembly of relatively small surfaces 46 regularly spaced and separated by recesses 48. In the embodiment described with reference to FIGS. 3 to 6, the recesses 48 are regularly spaced grooves of V-shaped cross-section. The grooves 48 comprise two series of parallel, equispaced grooves 50, 52 intersecting each other and inclined symmetrically relative to the direction in which the caliper member 28 slides. The two series of grooves 50, 52 together define an angle of approximately 120°.

An arrangement of this kind substantially reduces the areas of contact between the keys 26 and caliper member 28 while maintaining a considerable bearing area between the two components, so that the caliper member is still satisfactorily guided. Because of the relatively small contact areas, the keys and caliper member cannot stick over large areas in particularly severe operating conditions. Also, the recesses 48 can accomodate impurities, and they will further facilitate sliding of the caliper member if they contain liquid or semi-solid lubricant, such as oil or grease.

Lastly, the frame forming portion 40 and the portion 42 which form the smooth, continuous surface define the recesses 48 relative to the outside of the guide surface 30, so that the recesses do not open on to the exterior. This makes it very difficult for impurities to reach the centre of the guide surface, however badly worn are the linings of the pads 16.

In the embodiment illustrated in FIGS. 7 and 8, the guide key of the caliper member differs from the key shown in FIGS. 3 and 4 only in the configuration of the guide surfaces. Elements fulfilling identical functions are designated by the same reference numerals plus 100.

The guide surface 130 of the key 126 has two axially spaced portions 134, 138 defined by a smooth, continuous surface forming a frame 140 and a portion 142 extending between the portions 134 and 138. The portion 134 comprises an assembly of relatively small surfaces 146, regularly spaced and separated by recesses 148. The recesses 148 are formed by grooves of U-shaped cross-section of which the base is substantially parallel to the corresponding portion of the guide surface 130. The grooves 148 comprises two series of parallel, equispaced grooves 150, 152 intersecting one another. The grooves 150 are substantially parallel to the direction in which the caliper member slides, whereas the grooves 152 are substantially perpendicular to this direction.

The portion 138 of the guide surface 130 consists simply of a recess to accomodate impurities.

The key just described with reference to FIGS. 7 and 8 has substantially the same advantages as the key described with reference to FIGS. 3 to 6.

In addition, each of the keys 26 or 126 may be coated with a layer of solid lubricant, at least on its guide surface 30 or 130. More particularly, the solid lubricant may be polytetrafluoroethylene, best known by the trade mark "TEFLON". The solid lubricant may be plunged into a cadmium bath, so that any irregularities in the lubricant coating do not promote oxidation of the key. The key is preferably entirely coated with solid lubricant and subsequently coated with cadmium by electro-deposition. This leads to a further substantial improvement in the sliding characteristics of the caliper member relative to the fixed member.

The invention is not restricted to the brake described by way of example, but may be applied to any brakes in which a caliper member or a frame member is slidable on a fixed member by means of at least one key.

Also, the shapes of the recesses and contact surfaces on the guide surface of the key may be different from those described by way of example, without thereby exceeding the scope of the invention.

What we claim is:

1. In a disc brake having a caliper member straddling a rotary disc and moving relative to the disc on two circumferentially spaced surfaces of a fixed member, at least one guide key cooperating with the caliper member and fixed member to provide for movement therebetween, brake applying means cooperating with the caliper member so as to urge a first friction pad and a second friction pad into engagement with the disc, to retard rotation of the latter and the guide key defining a surface which slidably cooperates with one of the members, the improvement wherein the guide key surface forms more than one assembly of relatively small surfaces, said surfaces being separated from each other by interconnecting grooves, and said guide key surface including a smooth continuous surface free of recesses, said smooth continuous surface enclosing more than one assembly of relatively small surfaces and separating each assembly from the other assembly.

* * * * *